Patented Feb. 15, 1927.

1,617,721

UNITED STATES PATENT OFFICE.

CHARLES E. NORTH, OF MONTCLAIR, NEW JERSEY.

PROCESS FOR MAKING MIXTURES OF COCOA OR CHOCOLATE AND MILK AND PRODUCT THEREOF.

No Drawing.      Application filed April 3, 1926. Serial No. 99,663.

My invention relates to improvements in the manufacture of beverages comprising a mixture of cocoa and milk or chocolate and milk, and has particular reference to the production of such beverages on a commercial scale for sale preferably in containers, such as glass bottles. Difficulties have been experienced in producing such beverages because the cocoa or chocolate has settled at the bottom of and the butter fat has risen to the top of the mixture if the same is kept for any considerable length of time.

The specific gravity of whole milk is 1.029. Since the specific gravity of milk fat is 0.960 and of cocoa 1.470 it will be apparent that milk fat is about 8% lighter than milk and cocoa is about 44% heavier than milk. As a consequence, if the mixture stands for only an hour or two a layer of milk fat can be seen on the top and a layer of cocoa on the bottom of the mixture in glass bottles. After standing over night there may be a layer as thick as an inch or more of creamy fat on top of the mixture and a layer as thick as a half inch of dark brown cocoa or chocolate at the bottom of such mixture referred to. Such separation of the fat and cocoa or chocolate from the mixtures impairs the marketability thereof.

Heretofore it has been the practice, on a commercial scale, to pass a mixture of milk and cocoa or milk and chocolate through a homogenizing machine for the purpose of preventing the depositing of the cocoa or chocolate particles at the bottom of the mixture and preventing the rising of fat globules to the top of the mixture. The mere forcing of such mixture through a homogenizing machine does not have the effect of preventing the settling of the cocoa or chocolate particles to the bottom or the rising of the fat globules to the top of the mixture for any protracted period of time. Furthermore, the passing of cocoa through a homogenizing machine does not affect the cocoa so far as its suspension in the mixture is concerned, but does damage the machine, since the cocoa fibers act as an abrasive and quickly wear out the orifices or passages in the machine through which the fibers are forced. It has also been proposed to sterilize such mixtures after the same have been homogenized in the manner stated, but mere sterilization of such mixtures, while having the effect to kill bacteria therein, does not in itself alone prevent the settling of the cocoa or chocolate fibers to the bottom nor the rising of the fat globules to the top of the mixture if the same is allowed to stand for a period of time.

The object of my invention is the production of mixtures of milk and cocoa in which the cocoa and fats if any, remain in suspension therein. In carrying out my invention I increase the normal friction between the milk liquid or fluid and the more solid materials or ingredients of my improved beverage, such as the butter fat or the particles of cocoa, or both, to such a degree as will maintain the fat and the solid material, such as cocoa, in suspension in the liquid. I accomplish the foregoing by increasing the friction or viscosity of the milk liquid or fluid against the surfaces of the particles of fat and the particles of cocoa to such an extent that their respective motions upwards or downwards in the mixture due to their differences in specific gravity from the gravity of the liquid is overcome. The friction of the liquid against the surfaces of the particles of fat or of solid material, such as cocoa, in the mixture is in direct proportion to the viscosity of the liquid or fluid, by which I mean the thickness or stickiness or tenacity of the liquid or fluid. If the viscosity of water is represented by 1.0 the viscosity of normal fluid milk is 1.8. I have discovered the precise points at which the viscosity and hence the friction is sufficient to prevent the rising of the fat to the top of such mixtures for twenty-four hours. The point for fat is 2.2, which means 2.2 times as viscous as water. I have also discovered the degree of viscosity and hence of friction necessary to prevent the settling of cocoa to the bottom of the mixtures of cocoa and milk for twenty-four hours. This is a viscosity of 2.5, which means a viscosity 2½ times as viscous as water.

Natural milk or partly skimmed milk or skim milk may be used as may be desired for the mixture. The treatment of the mixture containing the homogenized and acidified milk to the temperatures and pressures for the periods of time hereinafter specified causes coagulation of albumen and casein in the milk for increasing its viscosity or friction to such an extent that the casein and albumen will be transformed into a smooth jelly-like mass with no curds but of a thickness that makes the liquid creamy in consistency, which may have a viscosity of 2.50, so that the cocoa fibers will remain in suspension with practically no settling of the cocoa or the casein to the bottom of the mixture for a protracted period of time.

The milk may first be treated alone so as to break fat globules therein into such minute particles that they will not quickly rise to the surface of the milk, and after this treatment the cocoa or chocolate may be added to the milk as required for the mixture. The breaking up of the fat globules into smaller particles such as is done in homogenizing increases the amount of fat surfaces exposed and the number of particles and the extent of their distribution. Consequently by such breaking up the viscosity or internal friction of the milk fluid is increased. The pressure of the processes used to break up fat globules also has an effect on the casein of milk and skim milk causing the same to become more viscous. These factors by increasing viscosity and friction assist in preventing the rising of fat particles to the top of cocoa-milk mixtures and also to some extent assist in delaying the fall of cocoa fibers to the bottom of such mixtures. But these factors alone, while of some assistance, are not in themselves sufficient to prevent the rising of fat and the falling of cocoa in cocoa-milk mixtures.

To assure the stability of such mixtures and especially to prevent the falling of the cocoa therein I subject the mixtures to the action of heat combined with pressure under carefully controlled conditions. It only happens to be incidental that such heat and pressure also sterilize these mixtures. I have discovered that the acidity of the milk, whether whole milk or skim milk, and of the cocoa-milk mixtures bears a definite relation to the temperatures and pressures and periods of time required for successful treatment. For sterilizing purposes alone the range of temperatures and times is a wide one. But for each degree of acidity of the milk and its mixtures the ranges are not only very narrow but must be selected with the utmost care if the treatment is to be successful in producing exactly the correct degree of viscosity to hold cocoa in suspension. If temperatures, or pressures or times are insufficient the cocoa is not held in suspension in the mixtures. On the other hand if temperatures, or pressures or times are excessive then the casein is curdled and separates from the mixtures. Briefly, where temperature and pressure and period of time are fixed then acidity of the milk or its mixtures must be adjusted to a definite degree. On the other hand where such acidity is not adjusted but remains fixed then temperature and pressure and period of exposure must be adjusted to correspond. This relation between acidity and the heat, pressure and time treatment and its variation and adjustment I have discovered may be and must be exactly controlled to bring about those increases in the viscosity of the mixtures which are necessary to hold the cocoa fibers in suspension, without curdling the casein to such an extent that it will separate from the mixtures.

In this specification and the appended claims I use the term "cocoa" to include commercial cocoa fibers and chocolate and any equivalent edible solid material suitable for the beverage herein referred to, and the word "milk" to include either whole milk or skim milk.

In carrying out my invention I preferably first homogenize the milk, for example by passing the same through minute passages or orifices under high pressure, from 1500 to 6000 pounds to the square inch, as in a homogenizing machine, and break fat globules into a mass of minute particles much smaller than their natural condition, thereby distributing such particles in the fluid and increasing the viscosity or friction of the milk by thickening the casein before the addition thereto of the cocoa or chocolate for the mixture. While there are some advantages in using milk and skim milk that have first been homogenized desired results can be obtained without homogenization.

I test the milk for acidity by the titration method using standardized solutions and dilutions of normal alkali. Or the acidity may be determined by the methods used for testing the hydrogen ion concentration of the milk. These acidity tests may be made before or after the milk is homogenized. A standard cocoa syrup is then added to the milk. While such syrup may also have acidity, yet when a standard syrup is used this can be made a constant factor and the testing of the milk acidity is all that is needed to determine variations in the acidity of the mixtures. (The deep color of the cocoa makes acidity tests of the mixtures by color reactions impractical).

By numerous experiments I have discovered the extent of the heat, pressure and time treatment which must be used for each degree of acidity of milk to obtain the viscosity necessary to hold cocoa fibers in suspension without curdling the casein to such an extent that it will separate from the mixtures. Milk containing more than .18% lactic acid is unfit for use because the casein is curdled and precipitated too easily even with slight heat and pressure. But any sweet milk with percentages of lactic acid below .18 can be used.

The equipment for the heat, pressure and time treatment may consist of any suitable type of metal cylinder or chest or retort or kettle which can be hermetically closed and of sufficient strength to sustain desired pressures. Pressure heaters filled with water may also be used as well as heaters using only loose steam. While some of the types of so-called steam sterilizers are suitably built to fulfill the requirements the treatment and its effects have no connection with sterilization. The effect on micro-organisbs has no relation to the effect on milk or casein or cocoa. While sterilization is desirable it is only incidental to the chief object which is an increase in viscosity. Sterilization will result from any heat and pressure from 220° F. at 5 lbs. for one hour to higher temperatures and pressures for shorter times. But there must be no such range or uncertainty if the desired degree of viscosity of the milk-cocoa mixtures is to be obtained.

In the case of a steam pressure chest of small capacity and low pressure limits the acidity of the milk should be adjusted to suit the conditions. For example, if the capacity requires that the chest be operated once each hour and the pressure is 5 pounds and the temperature 220° F. then the acidity of the milk should be between .17% and .18% allowing a period of 15 minutes for heating up, and 30 minutes at 220° F. at 5 lbs., for treatment, and 15 minutes for cooling down to attain the desired result. If fresh milk is used having an acidity of only .10% then a culture of lactic acid organisms should be added and the acidity be increased until the milk reaches the desired acidity of .17. In the case of a steam chest of large capacity with slower operation where the pressure and temperature limits are higher the acidity of the milk may be lower. For example, if the operation may occupy a period of one hour and a half and the pressure be 15 lbs., and the temperature 248° F. the acidity of the milk should be adjusted to about .13%. In short, with low temperatures and pressures the acidity should be high and with high temperatures and pressures the acidity should be low where the time of treatment is the same. On the other hand, if the temperatures and pressures are fixed then the time factor should be adjusted to the acidity. With high acidities the time factor is short. With low acidities the time factor is long. The limits of treatment are very definite. The object of the treatment is to partially coagulate the casein. This coagulation must be sufficient to create a viscosity that will hold the cocoa in suspension. But it must not be overdone or the casein will be curdled and may separate from the mixture. The line between coagulation of casein into a soft and light jelly and curdling is a very narrow one. If the coagulation is not sufficient then the cocoa will not remain in suspension in the mixture.

In the case of a steam pressure chest which has a wide range of pressures and temperatures it is possible to use milk of any acidity between .10% and .18% and to make use of a temperature and pressure and period of treatment which bears the correct relation to the acidity, as ascertained by the acidity test. For example, with milk of an acidity of .13%, a temperature of 248° F. and pressure of 15 lbs., and heating up for 15 minutes, holding at full temperature and pressure for about 55 minutes and cooling down for 15 minutes will turn casein into a jelly-like condition giving the mixture a viscosity that will hold cocoa in suspension without curdling the casein to such an extent that it will separate from the mixture.

The entire treatment may be applied to the milk alone and the right viscosity of the milk secured and the cocoa or cocoa-syrup added afterwards. For example, skim milk or whole milk may be so treated in 40 quart cans and after treatment transported to another place where it is then mixed with cocoa-syrup and the mixture bottled. Or the milk or skim milk may be homogenized in one place, heated under pressure in another place, and mixed with cocoa in another place.

The manufacturer may, however, heat milk or skim milk in open vessels such as pails, or cans, or tanks, by placing these in steam pressure chests such as those employed in the canning industry and after heating the contents to 248° F. at a pressure of 15 lbs. to the square inch for between twenty-five and thirty minutes he may then remove the milk from the pressure chest and mix cocoa or chocolate and sugar with the same and place the mixture in his final containers, such as cans and bottles. By such practice he would obtain mixtures which will not separate but would sacrifice some of the advantages of sterilization and keeping qualities for a wider choice of containers and of closures for the same.

The effect of such high temperature and pressure as 248° F. and 15 lbs. to the square inch for a period of thirty minutes is not only to change the nature of the albumen and casein and increase the viscosity of milk but also to kill all bacteria, yeasts and moulds in such mixtures. In short, the high temperatures and pressures sterilize these mixtures and by sterilization entirely remove their perishability so far as the growth of micro-organisms is concerned. As a consequence when proper care is taken to provide containers which are sealed so as to permit no risk of contamination the cocoa-milk mixtures so treated not only do not separate but also do not decompose.

While I have specified that the milk is increased in viscosity by homogenizing and cocoa itself is not affected by the homogenizer so far as its suspension in the mixture is concerned, nevertheless my process can also be applied to mixtures of milk and cocoa which have been homogenized. The acidity tests and temperature, pressure and time factors can be adjusted to homogenized milk-cocoa mixtures so as to obtain the viscosity which will hold cocoa fibers in suspension without curdling the casein to such an extent that it will separate from the mixture.

While it is preferable to add sugar to the milk and cocoa mixture it is customary, on a commercial basis, to add to the milk a cocoa-syrup which may comprise 8% of cocoa, 16% of sugar and 76% of water, although other proportions of such ingredients may be used. In practice it is customary to use such a bulk of syrup as will occupy 25% of the finished product of the milk and cocoa mixture.

This application is a continuation, in part, of my application Serial No. 50,485, filed August 15, 1925.

Having now described my invention what I claim is:

1. The process of making mixtures of milk and cocoa which consists in homogenizing the milk, testing the milk for acidity, adding cocoa to the milk, selecting a suitable temperature and pressure and period of heating, having a proper relation to the acidity, subjecting the milk and cocoa mixture to such temperature and pressure for such period of time to coagulate the albumen and casein into a jelly with sufficient viscosity to hold substantially all of the cocoa in suspension without curdling the casein to such an extent that it will separate from the mixture.

2. The process of making mixtures of milk and cocoa which consists in testing the milk for acidity, adding cocoa to the milk, selecting a suitable temperature and pressure and period of heating, having a proper relation to the acidity, subjecting the milk and cocoa mixture to such temperature and pressure for such period of time to coagulate the albumen and casein into a jelly with sufficient viscosity to hold substantially all of the cocoa in suspension without curdling the casein to such an extent that it will separate from the mixture.

3. The process of making milk and cocoa mixtures which consists in subjecting the milk to temperature and pressure treatment, the temperature and pressure to which the milk is subjected and the time duration thereof and the acidity of the milk being correlated so that the milk will become coagulated sufficiently to hold substantially all the cocoa in suspension.

4. The process of making mixtures of milk and cocoa consisting in bringing the acidity of the mixture and the temperature, pressure and time of treatment into such a relation to each other as is required to coagulate the milk to sustain cocoa therein, and subjecting the mixture of such acidity to such a temperature and pressure for such a period of time to coagulate the milk to such an extent as will sustain substantially all the cocoa particles in suspension therein.

5. The process of making cocoa and milk mixtures which consists in determining the acidity of the milk and heating the mixture at a temperature and a pressure and for a period of time so regulated and adjusted to the acidity that the viscosity of the milk will be increased to an extent sufficient to hold substantially all of the cocoa in suspension.

6. The process of making milk and cocoa mixtures which consists in adjusting the acidity of the milk to such a degree that when heated the casein and albumen in the milk will be coagulated, and heating the mixture to such a degree of temperature under such a degree of pressure and for such a period of time as will change the natural viscosity of the milk to such a degree that substantially all of the milk fat particles and the cocoa will remain in suspension in the mixture.

7. The process of making milk and cocoa mixtures which consists in adjusting the acidity of the milk to such a degree that when heated the casein and albumen in the milk will be coagulated, adding cocoa to the milk, and heating the mixture to such a degree of temperature under such a degree of pressure and for such a period of time as will change the natural viscosity of the milk to such a degree that substantially all of the milk fat particles and the cocoa will remain in suspension in the mixture.

8. The process of making milk and cocoa mixtures which consists in adjusting the acidity of the milk to such a degree that when heated the casein and albumen in the milk will be coagulated, adding cocoa to the milk, and heating the mixture to a temperature of about 248° F. at a pressure of about 15 pounds to the square inch for a period of about 40 minutes to coagulate and thicken and increase the normal friction of the milk to cause substantially all of its fat particles and the cocoa to remain in suspension therein.

9. The process of making milk and cocoa mixtures which consists in adjusting the acidity of the milk to approximately .17 degrees of acidity, adding cocoa to the milk, and heating the mixture to such a degree under such a pressure and for such a period of time as will so increase the normal viscosity of the milk as to cause substantially all of the milk fat particles and the cocoa to remain in suspension in the milk.

10. The process of making cocoa and milk mixtures which consists in heating the mixture having an acidity not above .18 per cent to a temperature between 220° F. and 248° F. having a proper relation to the acidity, such temperature being maintained for a proper length of time to cause the casein of the milk to be coagulated to such an extent that it holds substantially all of the cocoa in suspension.

11. A fluid beverage comprising cocoa and milk in which the milk is in a coagulated condition and having a degree of viscosity sufficient to retain substantially all the cocoa in suspension.

12. A fluid beverage comprising cocoa and milk in which the milk is in a coagulated condition and having a degree of viscosity sufficient to retain substantially all of the cocoa and fat particles in suspension.

CHARLES E. NORTH.